US012743670B2

(12) United States Patent
Barello

(10) Patent No.: US 12,743,670 B2
(45) Date of Patent: Sep. 22, 2026

(54) EXTRACTING FEATURES FROM SCREEN IMAGES FOR TASK MINING

(71) Applicant: UiPath, Inc., New York, NY (US)

(72) Inventor: Gregory Allen Barello, Seattle, WA (US)

(73) Assignee: UiPath, Inc., New York, NY (US)

( * ) Notice: Subject to any disclaimer, the term of this patent is extended or adjusted under 35 U.S.C. 154(b) by 724 days.

(21) Appl. No.: 18/069,330

(22) Filed: Dec. 21, 2022

(65) Prior Publication Data

US 2024/0211836 A1 Jun. 27, 2024

(51) Int. Cl.
*G06Q 10/0631* (2023.01)
*G06T 3/4046* (2024.01)
(Continued)

(52) U.S. Cl.
CPC ..... *G06Q 10/06316* (2013.01); *G06T 3/4046* (2013.01); *G06T 9/002* (2013.01);
(Continued)

(58) Field of Classification Search
CPC ........... G06Q 10/06316; G06V 10/762; G06V 10/761; G06V 30/18; G06V 10/82;
(Continued)

(56) References Cited

U.S. PATENT DOCUMENTS 10,088,969 B2 10/2018 Schein et al.
11,176,443 B1 11/2021 Selva et al.
(Continued)

FOREIGN PATENT DOCUMENTS

CN 110785736 A * 2/2020 .............. G06N 3/08
KR 102439574 B1 9/2022
WO 2021219234 A1 11/2021

OTHER PUBLICATIONS

Xu et al., "LayoutLM: Pre-training of Text and Layout for Document Image Understanding," 2020, Proceedings of the 26th Acm Sigkdd International Conference on Knowledge Discovery & Data Mining, pp. 1192-1200.
(Continued)

*Primary Examiner* — Vu Le
*Assistant Examiner* — Matthew James Bodnark
(74) *Attorney, Agent, or Firm* — Chiesa Shahinian & Giantomasi PC

(57) ABSTRACT

Systems and methods for extracting features from screen images for performing a task mining task are provided. A screen image depicting a user interface of a computing system is received. The screen image is preprocessed to generate a preprocessed screen image and processing results. Image features are extracted from the preprocessed screen image using a first machine learning based network. Text features and control element features are extracted from the processing results using a second machine learning based network. The text features and the control element features are encoded using a third machine learning based network to generate representative features of the screen image. A task is performed on the screen image based on one or more of the image features, the text features, the control element features, or the representative features. Results of the task are output.

20 Claims, 6 Drawing Sheets

(51) Int. Cl.

| | |
|---|---|
| ***G06T 9/00*** | (2006.01) |
| ***G06V 10/44*** | (2022.01) |
| ***G06V 10/74*** | (2022.01) |
| ***G06V 10/762*** | (2022.01) |
| ***G06V 10/764*** | (2022.01) |
| ***G06V 10/82*** | (2022.01) |
| ***G06V 30/18*** | (2022.01) |
| ***G06V 30/412*** | (2022.01) |

(52) U.S. Cl.

CPC ............ *G06V 10/44* (2022.01); *G06V 10/761* (2022.01); *G06V 10/762* (2022.01); *G06V 10/764* (2022.01); *G06V 10/82* (2022.01); *G06V 30/18* (2022.01); *G06V 30/412* (2022.01)

(58) Field of Classification Search

CPC .... G06V 30/412; G06V 10/44; G06V 10/764; G06T 3/4046; G06T 9/002

See application file for complete search history.

(56) References Cited

U.S. PATENT DOCUMENTS

| | | | | |
|---|---|---|---|---|
| 11,182,178 | B1 | 11/2021 | Singh et al. | |
| 2020/0249964 | A1 | 8/2020 | Fernandes et al. | |
| 2021/0216336 | A1 | 7/2021 | Dubba et al. | |
| 2021/0256681 | A1 | 8/2021 | Segal et al. | |
| 2022/0197674 | A1 | 6/2022 | Ginoya et al. | |
| 2022/0350860 | A1 | 11/2022 | Walia et al. | |
| 2022/0382979 | A1* | 12/2022 | Klein et al. | G06F 40/284 40/284 |
| 2022/0394049 | A1 | 12/2022 | Abrahamian et al. | |
| 2023/0074706 | A1* | 3/2023 | Xiao et al. | G06K 9/62 |
| 2024/0046180 | A1 | 2/2024 | Ma et al. | |
| 2024/0303100 | A1 | 9/2024 | Nychis et al. | |

OTHER PUBLICATIONS

Jaegle et al., "Perceiver: General Perception with Iterative Attention," 2021, Proceedings of the 38th International Conference on Machine Learning, pp. 4651-4664.

Chen et al., "A Simple Framework for Contrastive Learning of Visual Representations," 2020, Proceedings of the 37th International Conference on Machine Learning, pp. 1597-1607.

He et al., "Momentum Contrast for Unsupervised Visual Representation Learning," 2020, Proceedings of the IEEE/CVF Conference on Computer Vision and Pattern Recognition, pp. 9729-9738.

Radford et al., "Learning Transferable Visual Models From Natural Language Supervision," 2021, Proceedings of the 38th International Conference on Machine Learning, pp. 8748-8763.

Devlin et al., "BERT: Pre-training of Deep Bidirectional Transformers for Language Understanding," 2019, arXiv:1810.04805, 16 pgs.

Final Rejection mailed Jul. 14, 2025, in connection with U.S. Appl. No. 18/049,276, filed Oct. 24, 2022, 26 pgs.

Office Action mailed Mar. 17, 2026 in connection with U.S. Appl. No. 18/049,276, filed Oct. 24, 2022, 50 pgs.

* cited by examiner

100

Display
125
Keyboard
130
Cursor Control Device
135
Communication Device
120
Processor(s)
110
Bus
105
140
145
150
Operating System
Feature Extraction Module
Other Functional Modules
Memory 115

200
Pixel
Input Layer
Hidden Layer 1
Hidden Layer 2
...
Output Layer
(0,0)
1
Text Field 1
(0,1)
2
Text Field 2
(0,2)
3
Text Label
(1919,1079)
I
Submit Button
FROM LAST HIDDEN LAYER XAML RPA Workflows
Labeled Screens
Semantic Associations

310

Train AI/ML Model

320

Review Results

330

Threshold Met?

340

NO

Supplement Training Data and/or Modify Reward Function

350

YES

Test on Evaluation Data

360

Threshold Met?

370

NO

YES

Deploy AI/ML Model

380

400

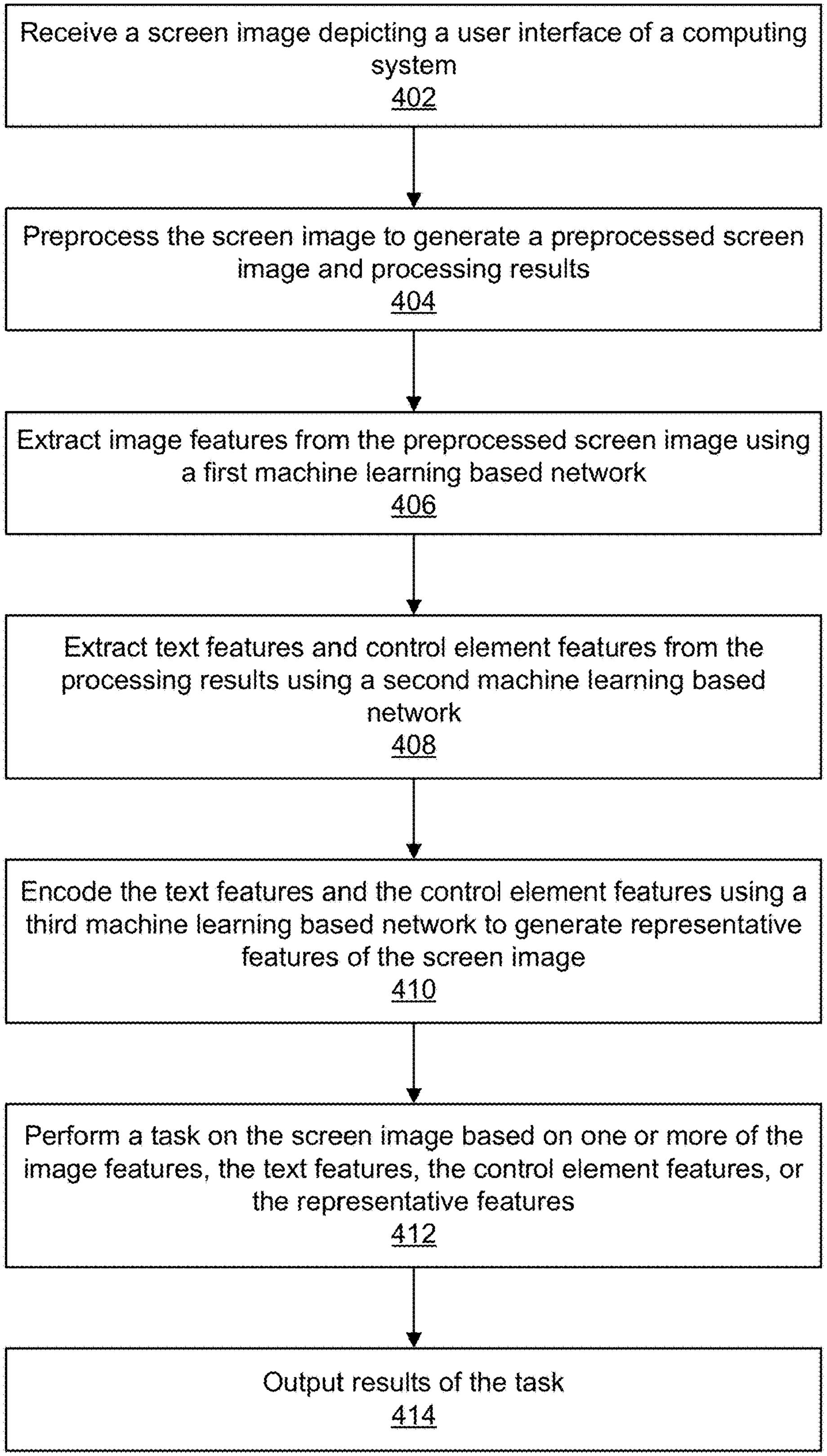

FIG. 4

Receive a screen image depicting a user interface of a computing system
402

Preprocess the screen image to generate a preprocessed screen image and processing results
404

Extract image features from the preprocessed screen image using a first machine learning based network
406

Extract text features and control element features from the processing results using a second machine learning based network
408

Encode the text features and the control element features using a third machine learning based network to generate representative features of the screen image
410

Perform a task on the screen image based on one or more of the image features, the text features, the control element features, or the representative features
412

Output results of the task
414

500

502

504 Preprocessed Screen Image

506 Processing Results

508 Resnet

510 Image Rep. Features

512 Transformer

514 Per-Box Rep. Features

516 Perceiver

518 Fixed-Size Page Rep. Features

520 CLR Loss

522 MLM Loss

EXTRACTING FEATURES FROM SCREEN IMAGES FOR TASK MINING

FIELD

The present invention generally relates to task mining, and more specifically, to extracting features from screen images for performing a task mining task.

BACKGROUND

Task mining may be performed to identify repetitive tasks in order to facilitate the automation of such tasks and calculate potential time and/or cost savings. Conventionally, task mining is performed by a pixel-wise comparison of screen images depicting user interfaces of computing systems to determine a similarity between the screen images. However, such conventional comparison of screen images can only determine the similarity between the screen images if either the user interfaces depicted therein are visually near-identical or if the screen images are assigned predefined categories.

Accordingly, an improved and/or alternative approach for tasking mining may be beneficial.

SUMMARY

Certain embodiments of the present invention may provide alternatives or solutions to the problems and needs in the art that have not yet been fully identified, appreciated, or solved by current task mining technologies. For example, some embodiments of the present invention pertain to extracting features from screen images to perform a task, such as, e.g., a task mining task.

In one embodiment, systems and methods for extracting features from screen images for performing a task are provided. A screen image depicting a user interface of a computing system is received. The screen image is preprocessed to generate a preprocessed screen image and processing results. Image features are extracted from the preprocessed screen image using a first machine learning based network. Text features and control element features are extracted from the processing results using a second machine learning based network. The text features and the control element features are encoded using a third machine learning based network to generate representative features of the screen image. A task is performed on the screen image based on one or more of the image features, the text features, the control element features, or the representative features. Results of the task are output.

In one embodiment, the text features comprise a set of features each representing a respective text box detected in the screen image, the control element features comprise a set of features each representing a respective control element detected in the screen image, and the representative features represent all text boxes and control elements detected in the screen image.

In one embodiment, the task comprises at least one of determining a similarity of the screen image with one or more other screen images, clustering the screen image with one or more other screen images, or grouping the screen image with one or more other screen images and classifying the grouped screen images by a type or category of the user interface depicted in the screen images.

In one embodiment, the second machine learning based network is trained with a masked language modeling loss and the first machine learning based network and the third machine learning are trained with a contrastive learning of representations loss.

In one embodiment, the screen image is resized to a predetermined size and pixel values in the screen image are normalized to generate the preprocessed screen image.

In one embodiment, the task is a task mining task performed to identify an automatable activity. An RPA (robotic process automation) workflow comprising the automatable activity is executed using one or more RPA robots.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 shows a method for extracting features from a screen image for performing a task, according to an embodiment of the present invention.

Unless otherwise indicated, similar reference characters denote corresponding features consistently throughout the attached drawings.

DETAILED DESCRIPTION OF THE EMBODIMENTS

Some embodiments pertain to extracting features from screen images for task mining.

Figure 1:
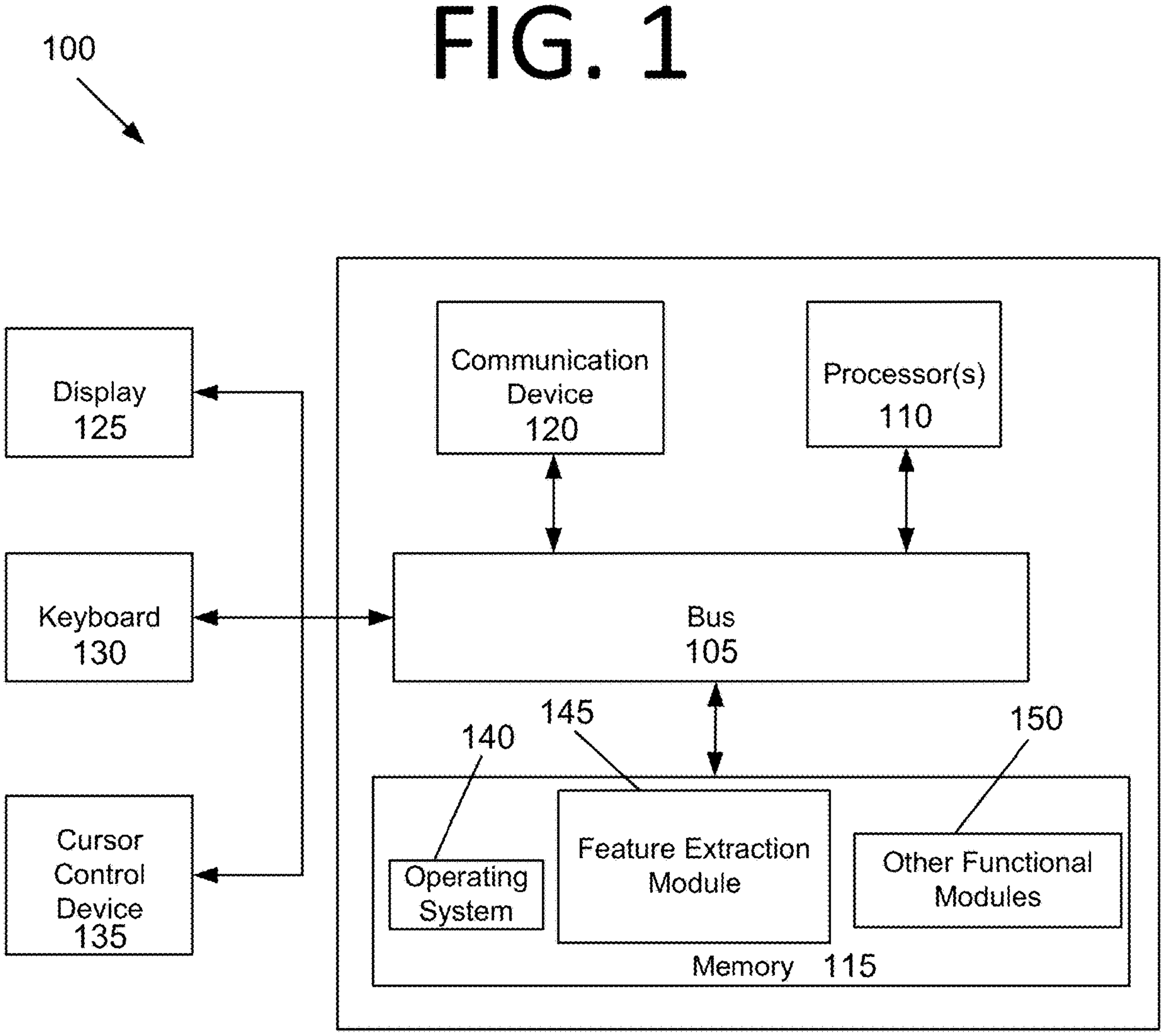
FIG. 1 is an architectural diagram illustrating a computing system configured to extract features from a screen image for performing a task mining task, according to an embodiment of the present invention.

FIG. 1 is an architectural diagram illustrating a computing system 100 configured to extracting features from screen images, according to an embodiment of the present invention. In some embodiments, computing system 100 may be one or more of the computing systems depicted and/or described herein. Computing system 100 includes a bus 105 or other communication mechanism for communicating information, and processor(s) 110 coupled to bus 105 for processing information. Processor(s) 110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 110 may also have multiple processing cores, and at least some of the cores may be configured to perform specific functions. Multi-parallel processing may be used in some embodiments. In certain embodiments, at least one of processor(s) 110 may be a neuromorphic circuit that includes processing elements that mimic biological neurons. In some embodiments, neuromorphic circuits may not require the typical components of a Von Neumann computing architecture.

Computing system 100 further includes a memory 115 for storing information and instructions to be executed by processor(s) 110. Memory 115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 110 and may include volatile media, non-volatile media, or both. The media may also be removable, non-removable, or both. Computing system 100 includes a communication device 120, such as a transceiver, to provide access to a communications network via a wireless and/or wired connection. In some embodiments, communication device 120 may include one or more antennas that are singular, arrayed, phased, switched, beamforming, beamsteering, a combination thereof, and or any other antenna configuration without deviating from the scope of the invention.

Processor(s) 110 are further coupled via bus 105 to a display 125. Any suitable display device and haptic I/O may be used without deviating from the scope of the invention.

A keyboard 130 and a cursor control device 135, such as a computer mouse, a touchpad, etc., are further coupled to bus 105 to enable a user to interface with computing system 100. However, in certain embodiments, a physical keyboard and mouse may not be present, and the user may interact with the device solely through display 125 and/or a touchpad (not shown). Any type and combination of input devices may be used as a matter of design choice. In certain embodiments, no physical input device and/or display is present. For instance, the user may interact with computing system 100 remotely via another computing system in communication therewith, or computing system 100 may operate autonomously.

Memory 115 stores software modules that provide functionality when executed by processor(s) 110. The modules include an operating system 140 for computing system 100. The modules further include a feature extraction module 145 that is configured to perform all or part of the processes described herein or derivatives thereof. For example, feature extraction module 145 may be configured to perform the steps of method 400 of FIG. 4. Computing system 100 may include one or more additional functional modules 150 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2A:
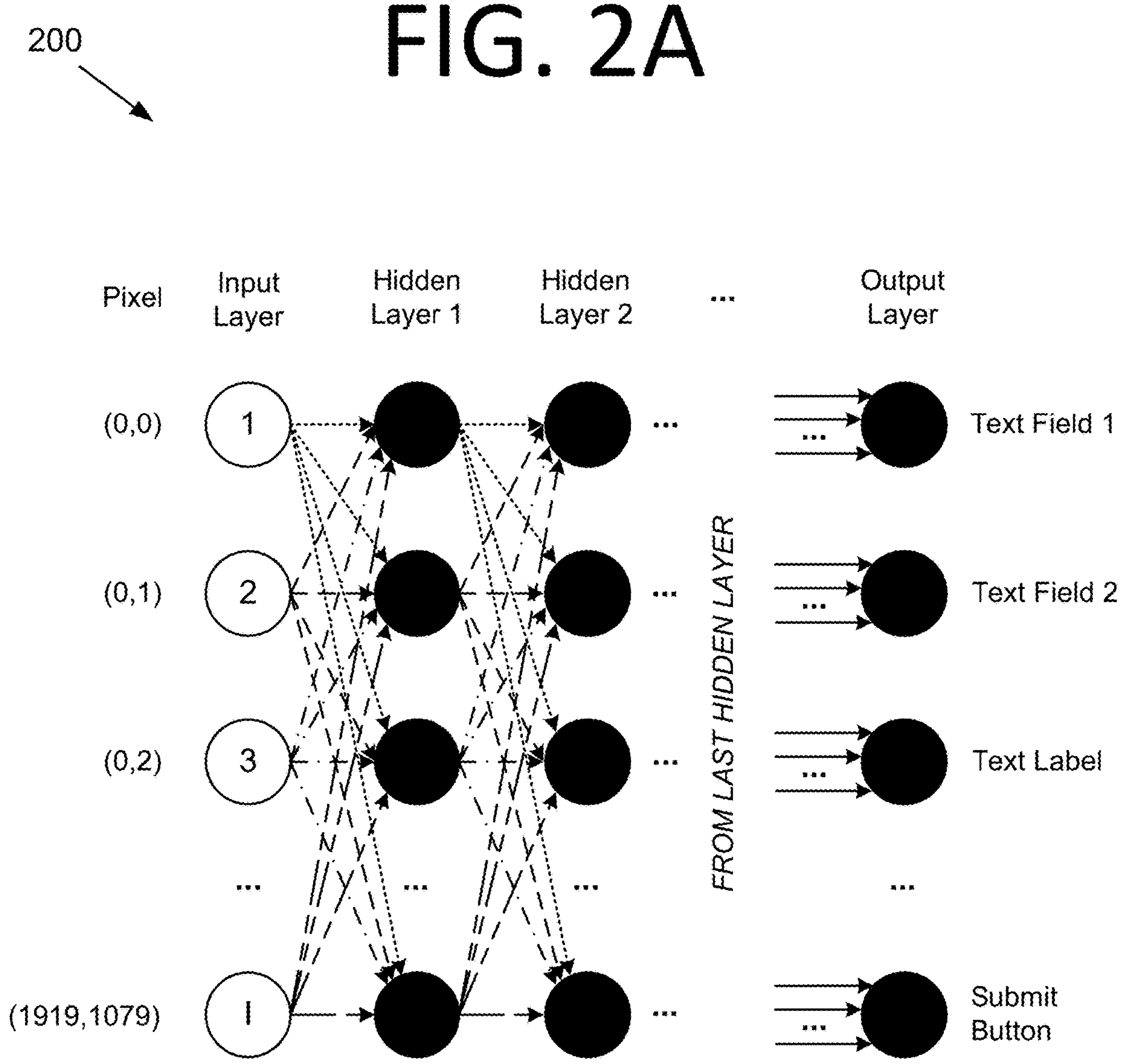
FIG. 2A illustrates an example of a neural network that has been trained to recognize graphical elements in an image, according to an embodiment of the present invention.

Various types of machine learning based networks (also referred to as AI/ML models) may be trained and deployed without deviating from the scope of the invention. For instance, FIG. 2A illustrates an example of a neural network 200 that has been trained to recognize graphical elements in an image, according to an embodiment of the present invention. Here, neural network 200 receives pixels of a screenshot image of a 1920×1080 screen as input for input "neurons" 1 to I of the input layer. In this case, I is 2,073,600, which is the total number of pixels in the screenshot image.

Neural network 200 also includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 200.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 2A, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 200 without deviating from the scope of the invention. Indeed, in certain embodiments, the types of neurons in a given layer may not all be the same.

Neural network 200 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields, a text label, and a submit button were found. Neural network 200 may provide the locations, dimensions, images, and/or confidence scores for these elements without deviating from the scope of the invention, which can be used subsequently by an RPA robot or another process that uses this output for a given purpose.

It should be noted that neural networks are probabilistic constructs that typically have a confidence score. This may be a score learned by the AI/ML model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative œ and positive ∞, or a set of expressions (e.g., "low," "medium," and "high"). Various post-processing calibration techniques may also be employed in an attempt to obtain a more accurate confidence score, such as temperature scaling, batch normalization, weight decay, negative log likelihood (NLL), etc.

"Neurons" in a neural network are mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 2B:
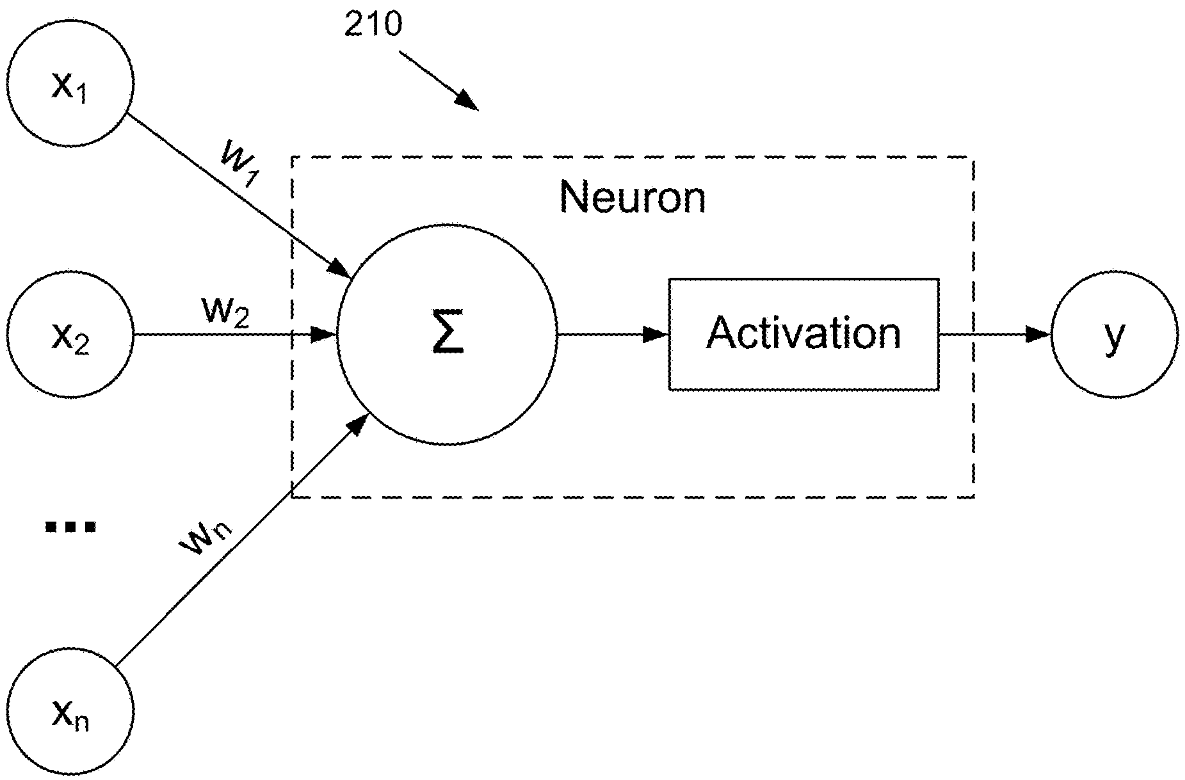
FIG. 2B illustrates an example of a neuron, according to an embodiment of the present invention.

An example of a neuron 210 is shown in FIG. 2B. Inputs $x_1, x_2, \ldots, x_n$ from a preceding layer are assigned respective weights $w_1, w_2, \ldots, w_n$. Thus, the collective input from preceding neuron 1 is $w_1x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 710 may thus be given by:

$$y = f(x)\sum_{i=1}^{m}(w_i x_i) + \text{bias} \tag{3}$$

In this case, neuron 210 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

The goal, or "reward function" is often employed, such as for this case the successful identification of graphical elements in the image. A reward function explores intermediate transitions and steps with both short-term and long-term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 200. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \dots f_1(W_1 x + b_1) \dots ) + b_{N-1}) + b_N) \quad (4)$$

In some embodiments, o is compared with a target output t, resulting in an error $$E = \frac{1}{2}\|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j)=f'_j(n_j)$, where $n_j$ is the network activity at layer j (i.e., $n_j=W_j o_{j-1}+b_j$) where $o_j=f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

where $\circ$ denotes a Hadamard product (i.e., the element-wise product of two vectors), $^T$ denotes the matrix transpose, and $o_j$ denotes $f_j(W_j o_{j-1}+b_j)$, with $o_0=x$. Here, the learning rate η is chosen with respect to machine learning considerations. Below, η is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest, employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Figure 3:
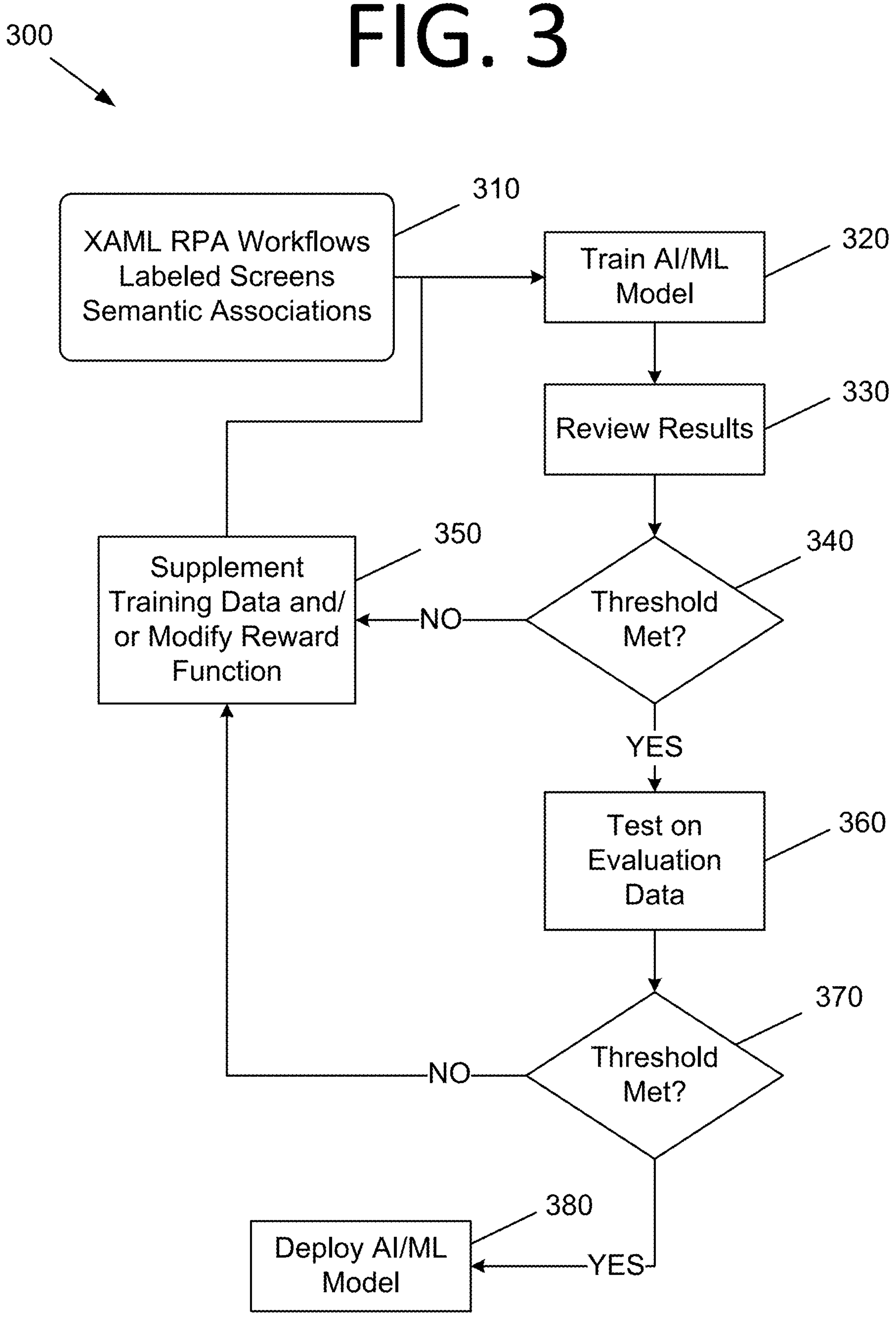
FIG. 3 is a flowchart illustrating a process for training AI/ML (artificial intelligence/machine learning) model(s), according to an embodiment of the present invention.

FIG. 3 is a flowchart illustrating a process 300 for training AI/ML model(s), according to an embodiment of the present invention. The process begins with providing training data, for instance, labeled data as shown in FIG. 3, such as labeled screens (e.g., with graphical elements and text identified), words and phrases, a "thesaurus" of semantic associations between words and phrases such that similar words and phrases for a given word or phrase can be identified, etc. at 310. The nature of the training data that is provided will depend on the objective that the AI/ML model is intended to achieve. The AI/ML model is then trained over multiple epochs at 320 and results are reviewed at 330.

If the AI/ML model fails to meet a desired confidence threshold at 340, the training data is supplemented and/or the reward function is modified to help the AI/ML model achieve its objectives better at 350 and the process returns to step 320. If the AI/ML model meets the confidence threshold at 340, the AI/ML model is tested on evaluation data at 360 to ensure that the AI/ML model generalizes well and that the AI/ML model is not over fit with respect to the training data. The evaluation data may include screens, source data, etc. that the AI/ML model has not processed before. If the confidence threshold is met at 370 for the evaluation data, the AI/ML model is deployed at 380. If not, the process returns to step 350 and the AI/ML model is trained further.

Embodiments described herein provide for extracting features from screen images for performing tasks. In particular, embodiments described herein apply a screens model comprising an ensemble of machine learning based networks to screen images depicting user interfaces of computing systems to extract sets of features. The screens model receives as input a screen image and generates as output, e.g., four sets of features representing different aspects of the screen image. The machine learning based networks of the screens model may be trained with unsupervised and/or self-supervised learning to train the machine learning based networks to extract the features representing the screen images in a compressed and expressive manner. The extracted features may be utilized for performing task mining tasks, such as, e.g., identifying similar screen images, identifying action categories for actions depicted in the screen images, or clustering screen images by type.

Figure 5:
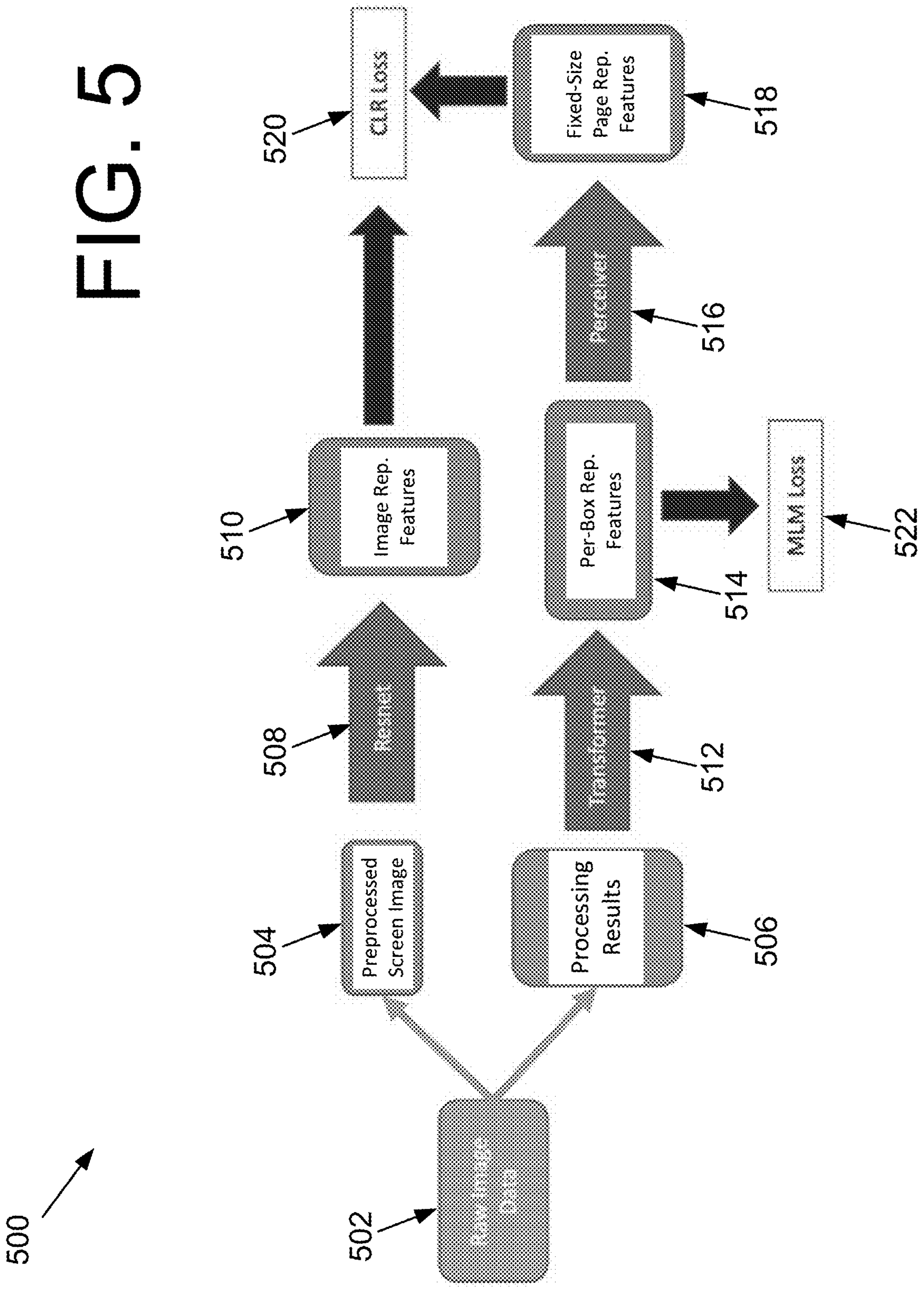
FIG. 5 shows a workflow for extracting features from screen images for performing a task, according to an embodiment of the present invention.

FIG. 4 shows a method 400 for extracting features from a screen image for performing a task (e.g., a task mining task), in accordance with one or more embodiments. The steps of method 400 of FIG. 4 may be performed by one or more computing systems, such as, e.g., computing system 100 of FIG. 1. FIG. 5 shows a workflow 500 for extracting features from screen images for performing a task (e.g., a task mining task), in accordance with one or more embodiments. FIGS. 4 and 5 will be described together.

At step 402 of FIG. 4, a screen image depicting a user interface of a computing system is received. In one example, as shown in workflow 500 of FIG. 5, the screen image is represented as raw image data 502. The computing system may be, for example, a personal computer, a laptop, a mobile device (e.g., phone), a tablet, or any other suitable computing system. The screen image may be in any suitable image format.

The screen image may be acquired in any suitable manner. For example, the screen image may be acquired by taking a screen shot of the user interface of the computing system. The screen image may be received directly from the computing system that acquired the screen image, can be received by loading a previously acquired screen image from a storage or memory of a computing system, or can be received from a remote computing system.

At step 404 of FIG. 4, the screen image is preprocessed to generate a preprocessed screen image and processing results. In one example, as shown in workflow 500 of FIG. 5, the preprocessed screen image and the processing results are preprocessed screen image 504 and processing results 506 respectively, which are generated from raw image data 502.

The screen image is preprocessed by applying an OCR (optical character recognition) and control detection model to generate the processing results. In one embodiment, the OCR and control detection model is implemented at least in part using machine learning. The OCR and control detection model receives as input the screen image and generates as output text boxes and control regions detected in the screen image as the processing results. Text boxes are boxes of text in the screen image. Control regions are regions of interactive user interface elements (e.g., buttons, checkboxes, text fields, etc.) in the screen image. In one embodiment, the detected text boxes and control regions are encoded using various embedding approaches with 2D-positional encodings.

The detected text boxes and control regions may be represented in any suitable manner. In one embodiment, each respective detected text boxes or control region may be represented by a collection of: 1) a sequence of floating-point numbers representing the region of the respective text box or control region (e.g., four numbers representing a rectangle (or any other polygon) by the vertical and horizontal location of the rectangle as well as height and width; 2) a string of text representing contents of the respective text box or a type of control (e.g., button, radio button, inoutbox, etc.) in the respective control region; and 3) any additional relevant flags (e.g., whether a radio button/checkbox is selected). These three properties are converted into a digital representation for ingestion by a machine learning based network.

The screen image is further preprocessed by resizing the screen image to a predetermined size (e.g., 224×224 pixels) and/or normalizing pixel values in the screen image to generate the preprocessed screen image. The resizing and the normalizing may be performed according to standardized values used for images that are input into the first machine learning based network (utilized at step 406 of FIG. 4).

At step 406 of FIG. 4, image features are extracted from the preprocessed screen image using a first machine learning based network. The image features are latent features representing the most discriminative image features of the preprocessed screen image. In one embodiment, the image features comprise a representation vector of the preprocessed screen image.

The first machine learning based network may be an image encoder network, such as, e.g., a ResNet (residual neural network)-32. However, the first machine learning based network may be any other suitable machine learning based network that can encode an image into a fixed-length vector of floating-point numbers. In one example, as shown in workflow 500 of FIG. 5, the first machine learning based network is ResNet 508, which receives as input preprocessed screen image 504 and generates as output image representation features 510.

At step 408 of FIG. 4, text features and control element features are extracted from the processing results using a second machine learning based network. The text features are latent features representing the most discriminative textual features in the screen image. The text features may be represented as a set or list of floating-point arrays, where each array represents a respective text box detected in the screen image. The control element features are latent features representing the most discriminative control element features in the screen image. The control element features may be represented as a set or list of floating-point arrays, where each array represents a respective control element detected in the screen image.

The second machine learning based network may be a text encoder, such as, e.g., a transformer neural network. However, the second machine learning based network may be any other suitable machine learning based network that can encode a variable number of tokens (e.g., each corresponding to a word or control element in the screen image) into a fixed-length vector for each token. In one example, as shown in workflow 500 of FIG. 5, the second machine learning based network is transformer 512, which receives as input processing results 506 and generates as output per-box (e.g., text box or control element box) representation features 514.

At step 410 of FIG. 4, the text features and the control element features are encoded using a third machine learning based network to generate representative features of the screen image. The representative features are latent features representing the most discriminative holistic features representing all text boxes and control elements in the screen image. The representative features may be represented as a floating-point array representing all text boxes and control elements in the screen image.

The third machine learning based network may be a perceiver neural network. However, the third machine learning based network may be any other suitable machine learning based network that can receive a variable number of inputs and generate a fixed-length output. In one example, as shown in workflow 500 of FIG. 5, the third machine learning based network is perceiver 516, that receives as input the per-box representation features 514 and generates as output fixed-size page representation features 518.

At step 412 of FIG. 4, a task is performed on the screen image based on one or more of the image features, the text features, the control element features, or the representative features. The task may be any suitable task performed on the screen image. In one embodiment, the task is a task mining task.

In one embodiment, the task mining task comprises determining a similarity of the screen image with one or more other screen images for grouping screen images for assisted task mining. For example, in this embodiment, the screen image and the other screen images may depict a same or similar user interface that different users are interacting with via different computing systems. The similarity of screens may be determined by applying a similarity metric to one or more of the image features, the text features, the control element features, or the representative features extracted from the screen image and the one or more other screen images. The similarity metric may be, e.g., Euclidean distance, cosine similarity, or any other suitable distance metric applicable to vector representations.

In one embodiment, the task mining task comprises clustering the screen image and one or more other screen images by type. The clustering may be performed by applying a clustering method to one or more of the image features, the text features, the control element features, or the representative features extracted from the screen image and the one or more other screen images. The clustering method may be, e.g., an unsupervised clustering method, such as, e.g., K-means clustering, DBSCAN (density-based spatial clustering of applications with noise), or any other suitable clustering method.

In one embodiment, the task mining task comprises grouping the screen image with one or more other screen images and classifying the grouped screen images by type or category of the user interface depicted in the screen image (for example, as a data table, a report, a user performing an action, etc.). In one example, the grouping and classification may be performed using a classification model. The classification model receives as input one or more of the image features, the text features, the control element features, or the representative features extracted from the screen image and the one or more other screen images and generates as output the group and classified screen images. The classification model may be, e.g., a logistic regression model, a decision tree, or any other suitable classification model.

The task mining task may be any other suitable task for performing task mining. For example, in one embodiment, one or more of the image features, the text features, the control element features, or the representative features may be input into a system which learns to present screen images as a time-series of screen images. The generation of a time-series of screen images is important in task mining, as the time-series of screen images may be utilized to learn activities that are not well represented by a single screen image (e.g., an end-to-end process, such as a "lead generation" or "taking a customer call" in a call center). By leveraging the one or more of the image features, the text features, the control element features, or the representative features to generate a time-series of screen images, various applications (e.g., comparison, clustering, classification, etc. as discussed above) may be performed on a time-series of screen images to represent a sequence of human-computer interactions.

In one embodiment, the task mining task is performed to identify automatable activities and the identified activities may be automated. In one example, an RPA (robotic process automation) workflow may be defined to comprise the identified activity and the RPA workflow may be automatically executed by one or more RPA robots. The RPA robots are implemented in software executed by one or more computing systems.

At step 414 of FIG. 4, results of the task are output. The results of the task can be output by, for example, displaying the results of the task on a display device of a computer system, storing the results of the task on a memory or storage of a computer system, or by transmitting the results of the task to a remote computer system.

In one embodiment, the screens model (comprising the first machine learning based network, second machine learning based network, and third machine learning based network) may be configured to encode selector data. The screens model may be fine-tuned using task mining data.

In one embodiment, the screens model is configured to encode text from a source other than the screen image, such as, e.g., a video, a user-provided text prompt, etc. to learn an association between screen images and text. In this embodiment, the task performed based on one or more of the image features, the text features, the control element features, or the representative features may comprise sorting, filtering, or searching through a collection of screen images or a time-series of screen images using natural-language queries. For example, a user may use the image features, the text features, the control element features, or the representative features to search a dataset of screen images for user interfaces matching the prompt "search for purchase orders" or any other natural language prompt.

In one embodiment, the one or more of the image features, the text features, the control element features, or the representative features may be used as input into an additional machine learning based network for extracting additional features. The additional machine learning based network may be, for example, a reinforcement learning model for understanding screen images or time-series of screen images for performing other tasks.

The machine learning based networks (e.g., the first machine learning based network, second machine learning based network, and third machine learning based network) utilized in method 400 of FIG. 4 and the machine learning based networks (e.g., ResNet 508, transformer 512, and perceiver 516) utilized in workflow 500 of FIG. 5 are trained for extracting features from screen images during a prior offline or training stage. For instance, as shown in workflow 500 of FIG. 5, transformer 512 is trained with MLM (masked language modeling) loss 522 and ResNet 508 and perceiver 516 are trained with CLR (contrastive learning of representations) loss 520. Once trained, the trained machine learning based networks are applied (e.g., in method 400 of FIG. 4 and workflow 500 of FIG. 5) during an online or inference stage for extracting features from screen images for performing task mining tasks.

For training the machine learning based networks, a large, targeted, unsupervised training dataset is first generated. Starting with a diverse collection of recordings of users interacting with computing systems, keyframes are extracted therefrom by, for example, iteratively sampling frames that are sufficiently different (e.g., pixel difference or any other suitable screen similarity measure) than the previous keyframe in the recording.

The training is performed with unsupervised and/or self-supervised learning based on the extracted keyframes by determining a sequence of gradient descent steps according to a loss function over minibatches. The loss function comprises an MLM loss providing a masked word prediction component and a CLR loss providing a contrastive loss comparing image and text encodings extracted from different training screen images as compared to same training screen images. The MLM loss is computed by replacing some number of words in the input with a MASK token. In one embodiment, control elements may also be masked with a token. The prediction of the true original words is optimized using the final word representation (OCR) for that token. The CLR loss is computed by first generating image features and representative features for a minibatch of training screen images (e.g., 900 screen images per minibatch) and then applying the contrastive loss between the image features and the representative features. In more detail, for a minibatch of training screen images, two "views" of each data point are represented, and the contrastive loss is applied between the two views of the datapoints in each minibatch. The two views could be, for example, two different crops of the same image, or the same image with the colors modified in two different ways, or any other modification of the input data which changes the appearance, but not the semantic meaning, of the data point.

In one embodiment, the training screen images may be augmented and the image features and the representative features utilized for computing the CLR loss may be generated from the augmented screen images. The augmentation may be performed by applying, for example, color jitter, random cropping, dropout of identification of text or control elements (e.g., by replacing all tokens with an "unknown" token UNK), dropout of positions of text or control elements (e.g., by replacing all box coordinates with full-page coordinates), random smooth deformation, etc.

The steps performed in FIGS. 3 and 4 may be performed by a computer program, encoding instructions for the processor(s) to perform at least part of the process(es) described in FIGS. 3 and 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 110 of computing system 100 of FIG. 1) to implement all or part of the process steps described in FIGS. 3 and 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method comprising:

receiving a screen image depicting a user interface of a computing system;

preprocessing the screen image to generate a preprocessed screen image and processing results;

extracting image features from the preprocessed screen image using a first machine learning based network;

extracting text features and control element features from the processing results using a second machine learning based network;

encoding the text features and the control element features using a third machine learning based network to generate representative features of the screen image; and performing a task on the screen image based on one or more of the image features, the text features, the control element features, or the representative features.

2. The computer-implemented method of claim 1, wherein the text features comprise a set of features each representing a respective text box detected in the screen image.

3. The computer-implemented method of claim 1, wherein the control element features comprise a set of features each representing a respective control element detected in the screen image.

4. The computer-implemented method of claim 1, wherein the representative features represent all text boxes and control elements detected in the screen image.

5. The computer-implemented method of claim 1, wherein the task comprises at least one of determining a similarity of the screen image with one or more other screen images, clustering the screen image with one or more other screen images, or grouping the screen image with one or more other screen images and classifying the grouped screen images by a type or category of the user interface depicted in the screen images.

6. The computer-implemented method of claim 1, wherein the second machine learning based network is trained with a masked language modeling loss.

7. The computer-implemented method of claim 1, wherein the first machine learning based network and the third machine learning are trained with a contrastive learning of representations loss.

8. The computer-implemented method of claim 1, wherein preprocessing the screen image to generate a preprocessed screen image and processing results comprises:

resizing the screen image to a predetermined size and normalizing pixel values in the screen image to generate the preprocessed screen image.

9. The computer-implemented method of claim 1, wherein performing a task on the screen image based on one or more of the image features, the text features, the control element features, or the representative features comprises performing a task mining task to identify an automatable activity, the method further comprising:

executing an RPA (robotic process automation) workflow comprising the automatable activity using one or more RPA robots.

10. A system comprising:

a memory storing computer instructions; and at least one processor configured to execute the computer instructions, the computer instructions configured to cause the at least one processor to perform operations of:

receiving a screen image depicting a user interface of a computing system;

preprocessing the screen image to generate a preprocessed screen image and processing results;

extracting image features from the preprocessed screen image using a first machine learning based network;

extracting text features and control element features from the processing results using a second machine learning based network;

encoding the text features and the control element features using a third machine learning based network to generate representative features of the screen image; and performing a task on the screen image based on one or more of the image features, the text features, the control element features, or the representative features.

11. The system of claim 10, wherein the text features comprise a set of features each representing a respective text box detected in the screen image.

12. The system of claim 10, wherein the control element features comprise a set of features each representing a respective control element detected in the screen image.

13. The system of claim 10, wherein the representative features represent all text boxes and control elements detected in the screen image.

14. The system of claim 10, wherein the task comprises at least one of determining a similarity of the screen image with one or more other screen images, clustering the screen image with one or more other screen images, or grouping the screen image with one or more other screen images and classifying the grouped screen images by a type or category of the user interface depicted in the screen images.

15. A non-transitory computer-readable medium storing computer program instructions, the computer program instructions, when execution on at least one processor, cause the at least one processor to perform operations comprising:

receiving a screen image depicting a user interface of a computing system;

preprocessing the screen image to generate a preprocessed screen image and processing results;

extracting image features from the preprocessed screen image using a first machine learning based network;

extracting text features and control element features from the processing results using a second machine learning based network;

encoding the text features and the control element features using a third machine learning based network to generate representative features of the screen image; and performing a task on the screen image based on one or more of the image features, the text features, the control element features, or the representative features.

16. The non-transitory computer-readable medium of claim 15, wherein the text features comprise a set of features each representing a respective text box detected in the screen image.

17. The non-transitory computer-readable medium of claim 15, wherein the second machine learning based network is trained with a masked language modeling loss.

18. The non-transitory computer-readable medium of claim 15, wherein the first machine learning based network and the third machine learning are trained with a contrastive learning of representations loss.

19. The non-transitory computer-readable medium of claim 15, wherein preprocessing the screen image to generate a preprocessed screen image and processing results comprises:

resizing the screen image to a predetermined size and normalizing pixel values in the screen image to generate the preprocessed screen image.

20. The non-transitory computer-readable medium of claim 15, wherein performing a task on the screen image based on one or more of the image features, the text features, the control element features, or the representative features comprises performing a task mining task to identify an automatable activity, the operations further comprising:

executing an RPA (robotic process automation) workflow comprising the automatable activity using one or more RPA robots.

* * * * *